Oct. 27, 1942. T. G. MYERS 2,299,921
VARIABLE RATIO TRANSMISSION MECHANISM
Filed Oct. 4, 1938 5 Sheets-Sheet 1

INVENTOR
Thomas G. Myers
BY John Flam
ATTORNEY

Oct. 27, 1942.    T. G. MYERS    2,299,921
VARIABLE RATIO TRANSMISSION MECHANISM
Filed Oct. 4, 1938    5 Sheets-Sheet 5

INVENTOR
Thomas G. Myers
BY John Flam
ATTORNEY

Patented Oct. 27, 1942

2,299,921

UNITED STATES PATENT OFFICE 2,299,921

VARIABLE RATIO TRANSMISSION MECHANISM

Thomas G. Myers, Los Angeles, Calif., assignor to U. S. Electrical Motors, Inc., Los Angeles, Calif., a corporation of California Application October 4, 1938, Serial No. 233,212

21 Claims. (Cl. 74—230.17)

This invention relates to a transmission mechanism utilizing variable diameter pulley structures.

Devices of this character usually include a belt of wedge-shaped cross section, the sides of the belt being in driving engagement with opposed inclined faces of a pair of pulley sections that are relatively axially adjustable. Movement of the sections away from each other permits the belt to move radially inwardly, and the effective pulley diameter is decreased. On the other hand, while the pulley structure is rotated, and the sections are brought closer together, the belt is urged radially outwardly by the sections, and the effective pulley diameter is increased.

A variety of mechanisms have been suggested and used for causing the pulley sections to operate in this manner. For example, the center distance between the driving and driven pulley structures may be adjustable; and one of the pulley structures may be of fixed diameter, the other being of the variable diameter type. As the center distance is increased, the diameter of the variable diameter pulley structure must be correspondingly reduced, since the belt length is of course a constant. As the center distance is reduced, the diameter of the pulley structure must be increased in order to keep the belt tight.

The two variables (center distance and effective pulley diameter) may be so arranged that variation of one of them automatically causes a variation in the other. For example, the center distance may be positively adjusted as by a lead screw and sliding base, and the pulley structure may have one of its sections spring-pressed toward the other section; the force of the belt operates to separate the sections against the spring when the center distance is increased; and the spring operates to urge the sections together when the center distance is reduced. Alternatively, the pulley sections may be positively adjusted, and the center distance may be caused to be correspondingly adjusted, as by using a spring or gravity. Again, both variables may be controlled by interlocked mechanisms, so that both the center distance and the pulley sections are positively adjusted.

In all these prior arrangements, care had to be taken to ensure that the belt would stay in substantial alinement between the driving and driven pulley structures. Thus if one pulley section is fixed on its shaft, and the other one is adjustable, the center line of the belt moves in an axial direction in accordance with the movement of the adjustable section. In order to compensate for this movement of the belt in an axial direction, one of the pulley structures is moved in an appropriate axial direction. This compensating movement may be accomplished by providing a slanting guide for the movable base that is used for varying the center distance.

It is one of the objects of this invention to make it possible to ensure substantial belt alinement in a system utilizing a variable center distance, in a simple manner, and without the necessity of any compensating lateral movement of either pulley.

In systems of this character, in which the center distance is variable, it has been common to cause a reduction in the effective diameter of the variable pulley structure as the center distance is varied, the other pulley structure having a fixed diameter. Such an arrangement causes a rather small variation in ratio, as compared with the variations in center distance. While in some instances such a slow variation of the ratio may be satisfactory, yet in many cases it is highly desirable to provide for a fast ratio variation. It is accordingly another object of this invention to make it possible to provide a relatively fast ratio variation. This result is accomplished by using variable pulley structures for both the driving and driven elements, the effective diameters being oppositely varied as the center distance is varied. Thus the pulley structure having a fixed axis is reduced in effective diameter while at the same time the pulley structure that has an axis movable with respect to the fixed axis, is increased in diameter as the center distance is increased. The result of this type of control is that the variation in center distance causes two contributing effects, additive as regards variation in the ratio of transmission. Accordingly a very short center distance variation is all that is required to effect a variation of the ratio between its limits. Furthermore, the limits of ratio variation are as large as if a fixed center distance were used, with variable pulley structures for both the driven and driving elements.

While these novel structures are useful for single belt drives, the same principles are applicable to multiple belt drives; and the power transmitted may be correspondingly increased.

This invention possesses many other advantages, and has other objects which may be made more easily apparent from a consideration of several embodiments of the invention. For this purpose there are shown a few forms in the drawings accompanying and forming part of the present specification. There forms, which illustrate the general principles of my invention, will now be described in detail; but it is to be understood that this detailed description is not to be taken in a limiting sense, since the scope of my invention is best defined by the appended claims.

Referring to the drawings.

Figure 1:
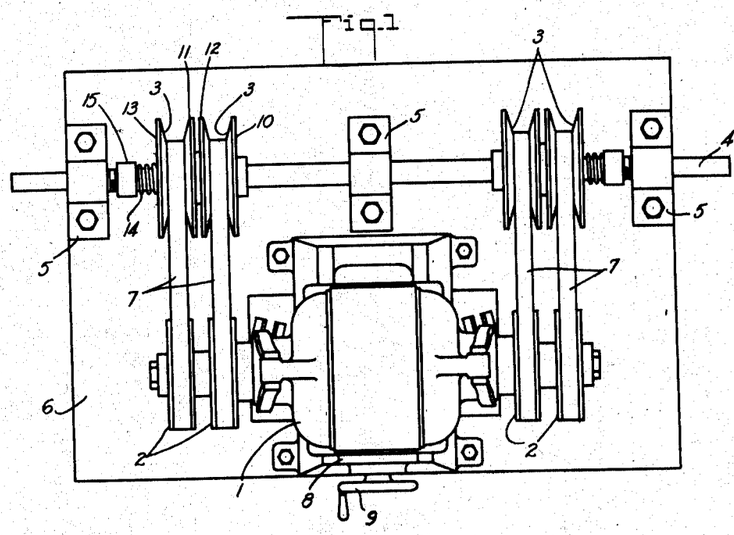
Figure 1 is a diagrammatic plan view, illustrating the general features of the invention.

In the diagram of Fig. 1 there is illustrated an electric driving motor 1 carrying the driving pulley structures 2 at each end thereof. These driving pulley structures are shown as in driving relation with the driven pulley structures 3, as by the aid of the belts 7. These pulley structures 3 are mounted on the driven shaft 4. This driven shaft is appropriately mounted as by standards 5, on a base 6. The pulley structures 2, as well as the pulley structures 3, may be of the variable diameter type as above described; or one of the pulley structures 2 or 3 may be of the fixed diameter type, while the other of the pulley structures may be of the variable diameter type. If the pulley structure 2 or 3 is of the fixed diameter type, then the motor base or motor and base should move axially to keep the belt in alignment. This can be accomplished by angular or slanting guides for the motor sub-base.

In order to vary the ratio of transmission from the motor shaft to the driven shaft 4, the motor 1 is movable in a direction normal to the axes of these shafts. For this purpose the motor is shown as mounted on a base 8 for sliding movement thereon as by a lead screw arrangement rotatable by hand wheel 9.

The variable diameter pulley structures 3 are formed in such a way that the pulley sections 10 and 11 are fixed to the shaft 4; the other pulley sections 12 and 13 are urged as by a compression spring 14, toward the pulley sections 10 and 11 respectively.

Thus as the center distance is increased, the belts 7 are drawn between the pulley sections of the pulley structures 3 and the effective pulley diameter is reduced. The spring 14 in this action is compressed against the abutment collar 15. However, in order to keep the belts in alignment with the pulley structures 2 and 3, arrangements are made for moving at least a part of the pulley structures 2 in an axial direction along the motor shaft. This is accomplished by the aid of a shift mechanism, an example of which will be later described in detail. This shift mechanism is interlocked with the lead screw mechanism operated by the hand wheel 9.

If the pulley structures 2 are made of the variable diameter type, the problem of keeping the belts in alignment is further simplified, for it is then possible by the aid of the lock mechanism, to move one of the cooperating pulley sections of each pulley structure 2 in such a way as to increase the pulley diameter as the center distance is increased. The advantages of this construction are quite pronounced. It has been found, for example, that even for a small variation in center distance, the resultant variation in ratio is quite large. This is apparent, because as the center distance is increased the pulley structures 3 are reduced in diameter, and at the same time the pulley structures 2 are increased in diameter. Thus contributing to the variation in the ratio are two factors; one, the increase in the center distance, which reduces the diameter of the driven pulley structure; and two, the increase in the effective diameter of the driving pulley structure. These factors are additive in their effect on the ratio variation.

In the form of the invention illustrated in Figs. 2, 4, 5, 6 and 7, a belt drive is illustrated, in which, as an example, two belts are shown, and in which both the driving and driven pulley structures have variable effective diameters. Obviously, a single belt or three or more belts can be used with this arrangement, as well as the two belts shown. In this case the driving motor shaft 16 is shown as carrying a pair of variable diameter pulley structures 17 and 18. The driven shaft 19 is also shown as carrying the variable diameter pulley structures 20 and 21. The motor 22 is mounted for movement in a direction normal to the axis of these two shafts, for varying the center distance between them. For this purpose, as shown most clearly in Figs. 4 and 5, the motor 22 is mounted on a base 23. This base 23 is shown as in dovetailed sliding relation with the supporting base 24. This supporting base 24 has a boss 25 at one end for journaling a lead screw 26. This lead screw is in threaded relation with the threaded boss 27 depending from the sliding base 23. The lead screw 26 carries the collars 28, 29 and 30 by the aid of the latter of which the lead screw is restrained from axial movement and collars 28 and 29 act as limits upon the motion of the base 23. In order to rotate the lead screw 26 use is made of a hand wheel 31 fastened to the exterior end of the lead screw 26. In the position shown in the figures, the center distance is a maximum, the threaded boss 27 being in contact with the limiting collar 29.

The driving pulley structures 17 and 18 are so arranged that the left hand pulley section 32 and 33 of each pulley structures 17 and 18 are axially fixed with respect to the shaft 16. On the other hand, the driven pulley structures 20 and 21 are so arranged that the right hand pulley sections 34 and 35 are fixed to the driven shaft 19. The other pulley sections are relatively axially movable. Since the pulley structures have pulley sections with oppositely inclined faces, the wedge shaped belts 135 and 136 contact the pulley structures on these inclined faces at an effective radial distance corresponding to the axial spacing of the cooperating pulley sections. This is all well understood. For example, in the position shown in Fig. 2, the pulley structures 17 and 18 have a maximum effective diameter, and pulley structures 20 and 21 have a minimum effective diameter. By moving the axially movable pulley sections 36 and 37 toward the right, the belts 135 and 136 may move inwardly to reduce the effective diameters of the pulley structures 17 and 18. This movement of the pulley sections 36 and 37 toward the right, causes the belts 135 and 136 to ride up on the fixed pulley sections 34 and 35 of the driven pulley structures 20 and 21. The adjustable pulley sections 38 and 39 are urged by the compression spring 40 toward the right to keep the pulley sections in operative contact with the belts 135 and 136.

The particular construction of the pulley structures disclosed may be varied somewhat. In the form illustrated in Fig. 2, the pulley section 35 is shown as fixed to the shaft 19 as by the set screw 41. The pulley section 34 is likewise fixed to the shaft 19 as by the aid of the set screw 42 passing through its hub 44. This set screw passes through a slot 43 in the hub 45 and its bushing 48 of the adjustable pulley section 39. The hub 44 of the fixed pulley section 34 embraces the hub 45 of the movable pulley section 39.

Figure 2:
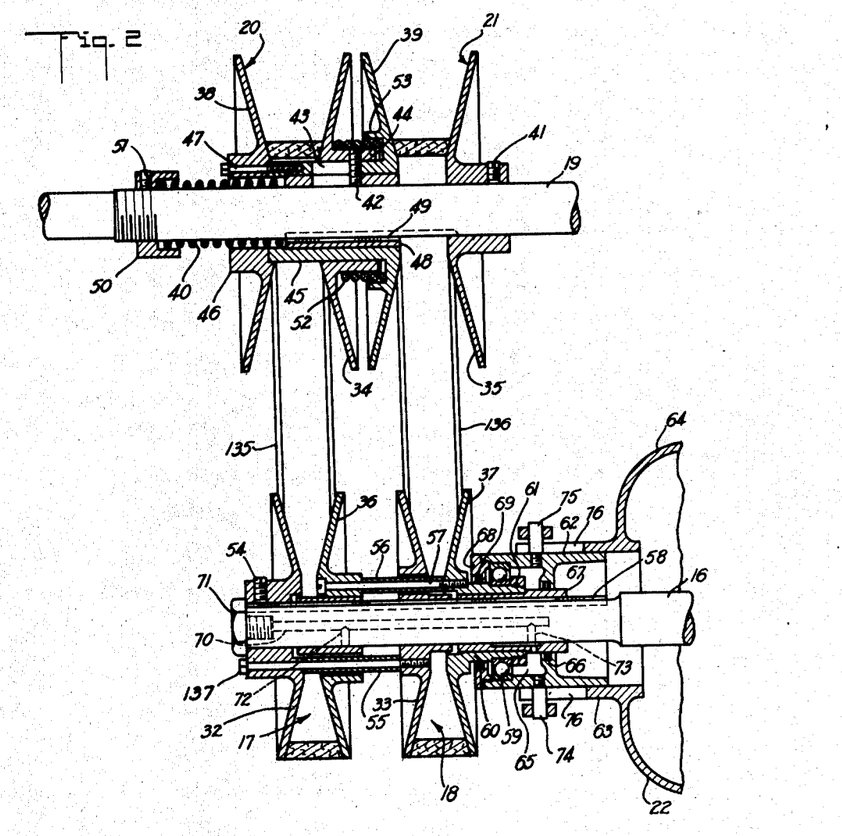
Fig. 2 is a fragmentary sectional view illustrating one embodiment of the invention.

The movable pulley sections 38 and 39 are fastened together for simultaneous adjustment as by having the hub 45 extending to the hub 46 of the pulley section 38. A plurality of screws 47 fasten the hubs together.

The movable pulley sections 38 and 39 are caused to move in unison in order to maintain them in driving relation to the shaft 19. The bushing 48 of the hub 45 of the movable pulley section 39 is shown as splined as by the key 49 to the shaft 19. Furthermore, the adjustable pulley sections are urged resiliently toward the right as before stated, by the aid of the compression spring 40 which may pass through the hub of the pulley section 39 to engage the end of the bushing 48. The left hand end of the compression spring 40 is shown as abutting a collar 50 threaded on the shaft 19 and held in adjusted position by the set screw 51. If desired, another compression spring 52 may be provided encompassing the hub 44 of the fixed pulley section 43 and engaging beneath the flange 53 of the adjustable pulley section 39 and acting against the back of the section 39.

The pulley structures 17 and 18 are somewhat similarly arranged. The fixed pulley section 32 is fixed to the shaft 16 as by the aid of the set screw 54. The other fixed pulley section 33 is spaced from the fixed pulley section 32 as by a plurality of bushings 55 through which pass a plurality of fastening screws 137. These bushings 55 pass through appropriate apertures in the pulley section 36.

The adjustable pulley sections 36 and 37 are shown as being fastened together for movement in unison by the aid of the bushings 56 and the fastening screws 57. The bushings 56 and screws 57 pass through appropriate apertures in the fixed pulley sections 33. The adjustable pulley sections 36 and 37 are shown as splined as by the aid of the key 58 to the shaft 16.

Movement in an axial direction of the pulley sections 36 and 37 is rendered positive and in accordance with the variation in center distance as by the aid of thrust ball bearing 59. This ball bearing is shown as having the inner race carried by the hub 60 of the adjustable pulley section 37 and as held in place by the nuts 61 engaging the end of the hub. The outer race of the ball bearing 59 is shown as accommodated in a cylindrical cup 62 slidable within the cylindrical extension 63 of the motor housing 64. A chamber 65 forms an enclosure around the bearing 59 within the cup 62. This is accomplished by the aid of the felt washer 66, engaging the bushing 67 that is inserted within the hub 60; and by the aid of the cap 68 threaded into the left hand end of the cup 62 and carrying a similar felt washer 69, engaging the hub 60.

Lubricant may be supplied to the various sliding surfaces and to the chamber 65, as by the aid of the central passageway 70 in shaft 16. This central passageway 70 may be normally closed by the screw 71; it is provided with one or more radial ports such as 72 and 73 leading to the sliding surfaces and into the chamber 65. Lubricant may be introduced from the exterior of the mechanism by removing the screw 71 and urging it through the passageway 70.

The motion of the base 23, in view of this rotation of the hand wheel 31, causes a corresponding axial adjustment of the cup 62. As the cup 62 is moved, such adjustment is made effective upon the pulley structure through the thrust ball bearing 59.

Figure 5:
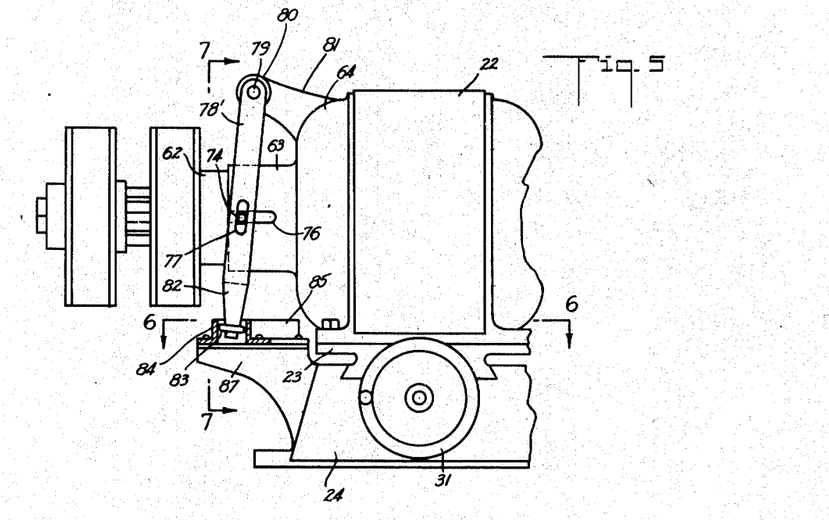
Fig. 5 is a side elevation showing a part of the apparatus illustrated in Fig. 4.
Figures 6, 7:
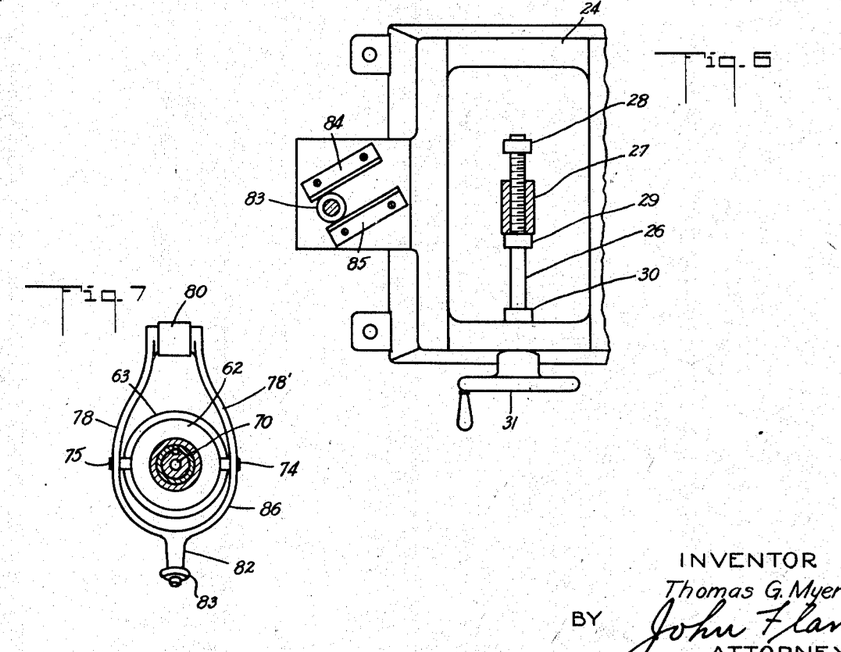
Fig. 6 is a fragmentary sectional view along the plane 6—6 of Fig. 5.
Fig. 7 is a fragmentary sectional view taken along the plane of 7—7 of Fig. 5.

Thus fastened to cup 62 and extending in diametrically opposite directions from the cup are a pair of pins 74 and 75. These pins engage in slots 76 in the cylindrical stationary guide 63. These pins are adapted to be accommodated in slots 77 (Figs. 5 and 7) arranged on the shift fork arms 78 and 79 of the shift fork 86. This shift fork embraces the cylindrical cup 62 and is pivotally supported at the top by the aid of the pin 79 and boss 80, fastened as by a bracket 81 to the housing 64. The lower portion of the shift fork carries an extension 82 (Fig. 7) provided with a roller 83 (Figs. 5, 6 and 7). This roller in turn is adapted to be engaged in a guideway formed by a pair of angle irons 84, 85. These angle irons are shown as supported on a bracket 87 shown as formed integrally with the supporting base 24. These angle irons 84 and 85 are disposed at such an angle that as the lead screw 26 is operated, the shift fork 86 is guided by the angle irons to move the cup 62 in an axial direction. It is apparent that (due to the slant of the guideway formed by the irons 84 and 85), as the center distance is increased, the effective diameters of pulley structures 17 and 18 are also increased. This ensures a fast variation of the ratio, especially when used in conjunction with the spring adjusted pulley structures 20 and 21.

Figure 4:
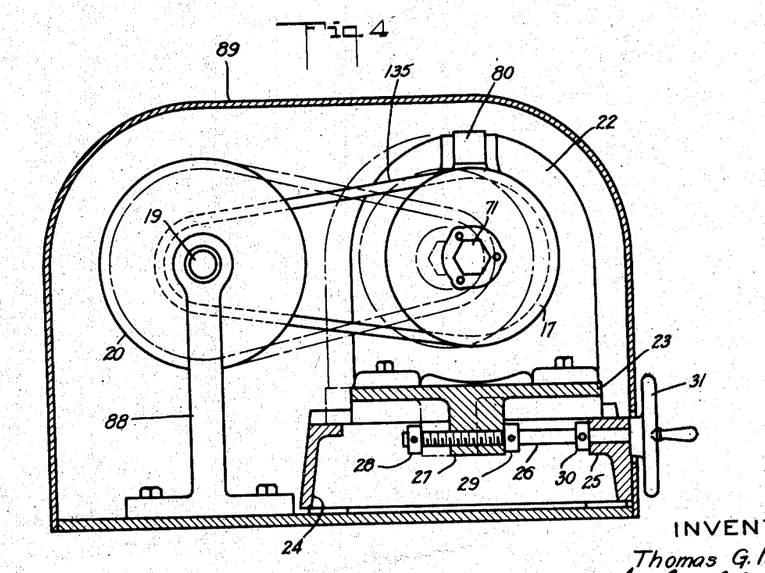
Fig. 4 is a vertical section on a reduced scale illustrating the form of the invention shown in Fig. 2.

As an example, with a maximum center distance of twenty inches, having a two-inch variation, and maximum pulley diameters of about fourteen inches, the ratio can be varied from about two to one, to a ratio of about one-half to one. The full line position of belt 135 in Fig. 4 illustrates maximum ratio position of about two to one, the center distance being a maximum. The dot-and-dash lines illustrate the position of the motor 22 and the belt 135 for the minimum center distance, at which the ratio is about one-half to one.

The shaft 19 as illustrated in Fig. 4 may be appropriately supported on the standards 88. Furthermore, there is indicated a cover or casing 89 that serves to protect the mechanism.

By so arranging the variable pulley structures that the fixed pulley sections on the driven shaft 19 face in the opposite direction from the fixed pulley sections of the pulley structures on driving shaft 16, the belts 135 and 136 remain in substantially accurate alignment for this entire range of ratio variation.

The resiliently adjustable pulley structures 20 and 21 may be arranged in other ways. For example, in the form of the invention illustrated in Fig. 3, the driven shaft 90 is shown as carrying the fixed pulley section 91. This pulley section is connected to the fixed pulley section 92 as by the aid of the spacers 93 and the screws 94. The corresponding adjustable pulley sections 95 and 96 are also shown as similarly connected together by the aid of the spacers 97 and screws 98. The spacers 93 and 97 pass through appropriate apertures in the intermediate pulley sections 95 and 92.

Figure 3:
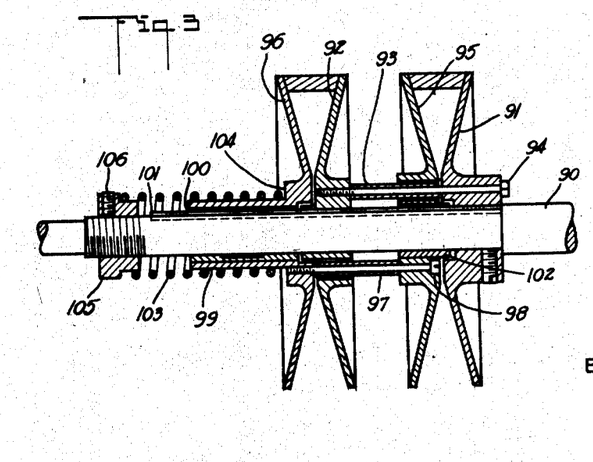
Fig. 3 is a fragmentary sectional view illustrating another form of variable diameter pulley structure that may be used in connection with the form shown in Fig. 2.

The left hand adjustable pulley section 96 is shown as carrying an elongated hub 99 and bushing 100, splined as by the key 101 to the shaft 90. The other adjustable pulley section 95 is also shown as having a bearing bushing 102 also splined on key 101. In this instance a single compression spring 103 serves to urge the pulley sections 95 and 96 toward the right, as by having the right hand end of the spring in engagement with the shoulder 104 on the hub 99. The left hand end of spring 103 abuts an adjustable collar 105 threaded on the shaft 90 and held in adjusted position by set screw 106.

It is not essential that both sets of pulley structures be of the adjustable variety. For example, in the form of the invention illustrated in Fig. 8, the belt drive includes the belts 107 and 108. Here, as in the form just described, two belts are shown by way of an example. These belts engage the resiliently adjustable pulley structures 109 and 110 carried by the driven shaft 111. The driving motor shaft 112 carries a fixed diameter pulley structure 113.

Figure 8:
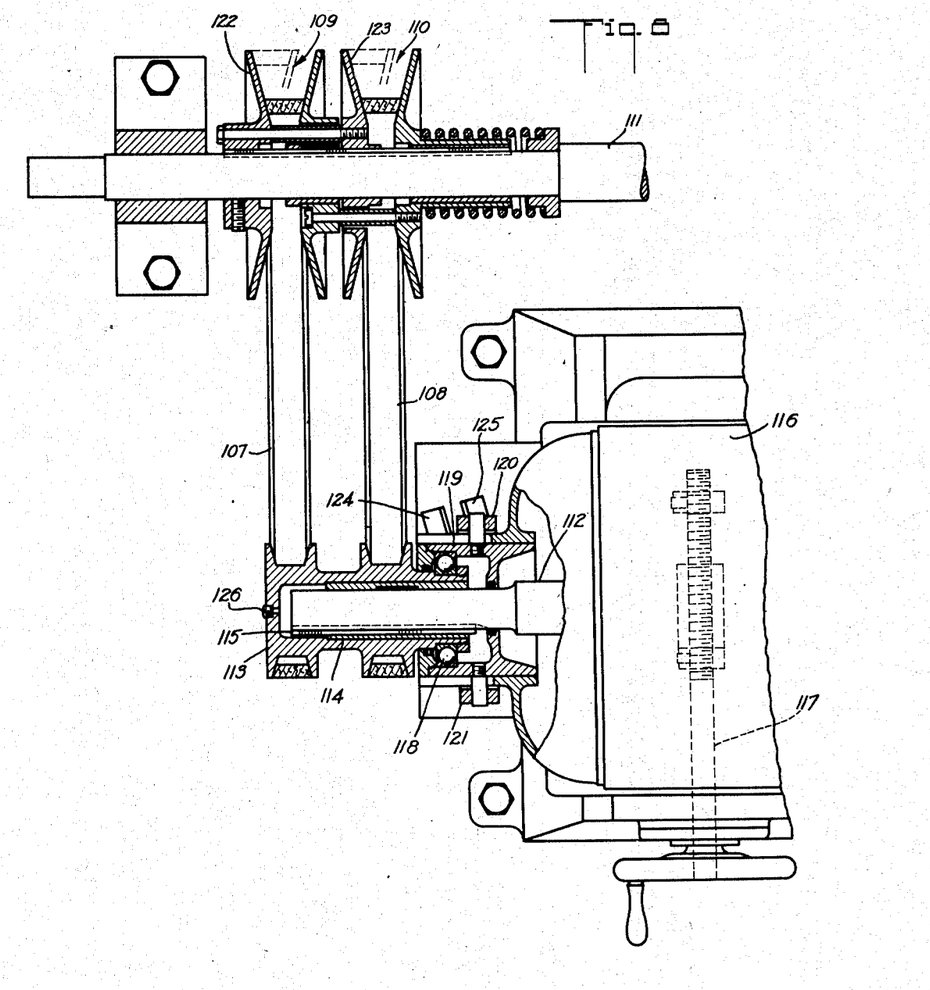
Fig. 8 is a view similar to Fig. 2 but showing a further modified form of the invention.

The pulley structures 109 and 110 are substantially identical to the form of pulleys illustrated in Fig. 3. The fixed diameter pulley structure 113, however, is shown as having a bushing 114 splined as by the aid of key 115 to the shaft 112. The motor 116 as before is adapted to be moved in a direction normal to the axes of the shafts 111 and 112 as by the aid of the lead screw mechanism 117.

The pulley structure 113 carries the inner race of ball thrust bearing 118 arranged in a cylindrical cup 119 similar in structure to that disclosed in Fig. 2. The shift yoke arms 120 and 121 operate as before to move the thrust bearing 118 in one or the other direction.

By virtue of the fact that in this instance the fixed pulley sections 122 and 123 of pulley structures 109 and 110 face toward the left rather than toward the right as in the other forms, the fixed diameter pulley structure 113 is arranged to be moved by the yoke toward the right as the center distance increases. In this way the belts 107 and 108 can be kept in quite accurate alignment for the complete range of operation. The angle irons 124 and 125 forming the slanting guide for operation of the cylindrical cup 119 are shown as being properly oriented to effect this result.

Grease may be introduced within the space surrounding the shaft 112 and as defined by the end flange of the pulley structure 113. For this purpose an aperture may be provided in the end flange normally closed by a plug 126.

As in the other forms of the invention, the driven pulley structures are automatically adjustable by virtue of spring pressure to keep the belts in proper driving relation. The other pulley structure 113 carried by the motor 116 is so arranged that it is positively actuated in an axial direction upon its shaft 112 in response to the operation of the lead screw mechanism 117 for varying the center distance. The embodiments are all illustrated as including multiple belts to make it possible to transmit large torques. However, the invention is capable of being used with single belts by appropriate deletion of the parts, or with three or more belts.

Figure 9:
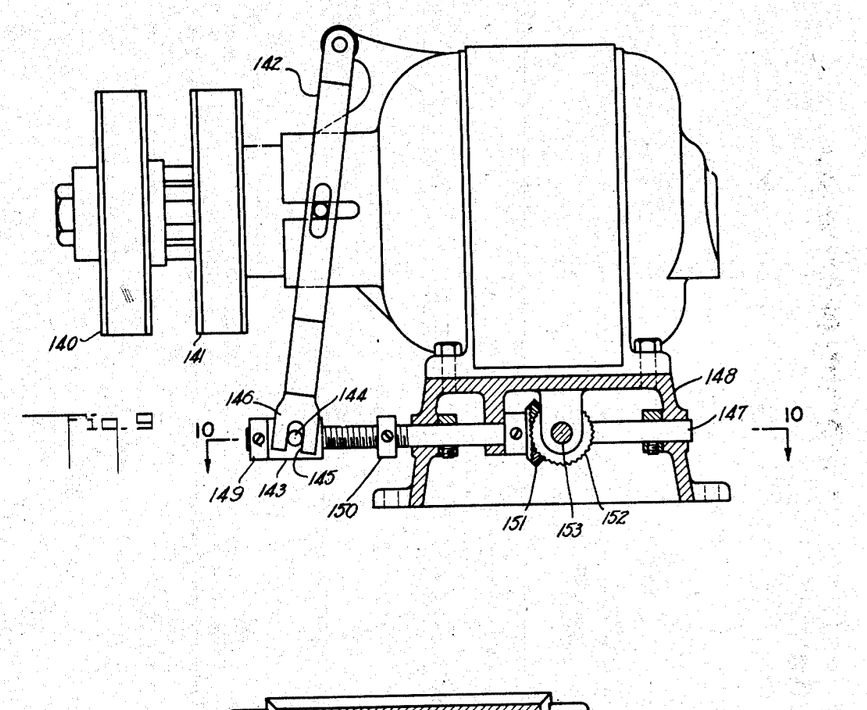
Fig. 9 is a side elevation of a motor and base, the latter broken away, showing another modified form of the invention.
Figure 10:
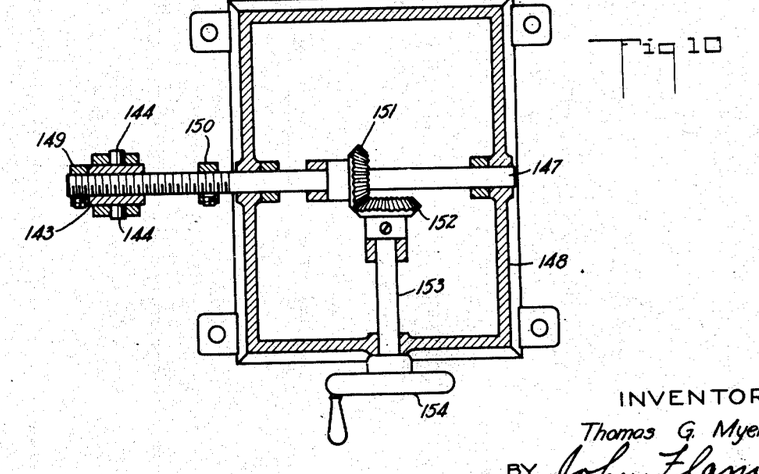
Fig. 10 is a section as seen on plane 10—10 of Fig. 9.

Figs. 9 and 10 show a simplified form of the invention in which the center distance between the shafts is fixed, and as before, two belts are shown by way of an example. The structure of the pulleys 140 and 141 is the same as that of pulleys 17 and 18 of Fig. 2, and it is to be understood that they are connected by belts to variable diameter pulleys as in that figure. The movable sections of pulleys 140 and 141 are adjusted axially on the motor shaft by a bifurcated lever 142 corresponding to lever 78. However, lever 142 is arranged to be moved by means of a nut 143 carrying pins 144 which engage slots 145 formed in the forked end 146 of the lever. This nut 143 is carried on a threaded rod 147 rotatably supported in the motor base 148. Obviously, rotation of rod 147 will cause the nut 143 to move longitudinally of the rod between limiting stops 149 and 150, swinging lever 142 about its pivot and moving the adjustable sections of the pulley. Shaft 147 must be approximately parallel with the motor shaft, and since it is preferable to have the means for operating it at the side instead of at the end, of the motor, a bevel gear 151 is secured on shaft 147. Another bevel gear 152 carried by a shaft 153, at right angles to shaft 147, engages gear 151. Shaft 153 is also rotatably supported by base 148 and carries a hand wheel 154 at its outer end. By the described construction, rotation of hand wheel 154 serves to axially adjust the movable sections of pulleys 140 and 141.

What is claimed is:

1. In a variable ratio transmission mechanism, a pair of pulley structures, a belt connecting the structures, one of said structures having a pair of relatively axially movable pulley sections with opposing inclined belt engaging faces, forming by axial relative adjustment, variable effective pulley diameters, means for varying the center distance between the structures, and means for increasing the effective diameter of said variable diameter pulley structure as the center distance is increased.

2. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, means for relatively moving the pulley structures to vary the center distance between them, and means operating in response to said variation in center distance, for adjusting the pulley sections so that the effective diameter of one pulley structure is increased and the effective diameter of the other pulley structure is decreased.

3. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, shafts on which said structures are respectively mounted, one section of each structure being axially fixed with respect to its shaft, and the other section being adjustably mounted thereon, the two fixed sections facing in opposite directions, means for relatively moving the pulley structures to vary the center distance between them, and means operating in response to said variation in center distance for axially moving the adjustable pulley sections.

4. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, shafts on which said structures are respectively mounted, one section of each structure being axially fixed with respect to its shaft, and the other section being adjustably mounted thereon, the two fixed sections facing in opposite directions, means for varying the center distance between the structures, means interconnecting one of the adjustable pulley sections with the means for varying the center distance, for causing the pulley section to be adjusted in accordance with the adjustment of the center distance, and means resiliently urging the other adjustable pulley section toward its corresponding fixed pulley section.

5. In a variable ratio transmission mechanism, a pair of pulley structures, a belt connecting the structures, one of said structures having a pair of relatively axially movable pulley sections with opposing inclined belt engaging faces, forming by axial relative adjustment, variable effective pulley diameters, means for moving the variable diameter pulley structure so as to vary the center distance between the pulley structures, and means, operated by virtue of an increase in the center distance, for increasing the effective diameter of said variable pulley structure.

6. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, means for moving one of the pulley structures so as to vary the center distance between the pulley structures, and means, operated by virtue of the variation in the center distance, for increasing the effective diameter of said one of the pulley structures, as the center distance is increased.

7. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, shafts on which said structures are respectively mounted, one section of each structure being axially fixed with respect to its shaft, and the other section being adjustably mounted thereon, the two fixed sections facing in opposite directions, means for moving one shaft so as to vary the center distance between the shafts, and means for adjusting the adjustable pulley section mounted on said movable shaft for increasing the effective diameter of the corresponding pulley structure as the center distance is increased.

8. In a variable ratio transmission mechanism, a pair of pulley structures, a belt connecting the structures, each of said structures having a pair of relatively axially movable pulley sections with opposing inclined belt engaging faces, forming, by relative axial adjustment, variable effective pulley diameters, shafts on which said structures are respectively mounted, one section of each structure being axially fixed with respect to its shaft, and the other section being adjustably mounted thereon, the two fixed sections facing in opposite directions, means for moving one shaft so as to vary the center distance between the shafts, means interconnecting the adjustable pulley section mounted on said movable shaft, with the means for varying the center distance, for causing said pulley section to be adjusted to increase the effective pulley diameter as the center distance is increased, and means resiliently urging the other adjustable pulley section toward its corresponding fixed pulley section.

9. In a variable ratio transmission mechanism, a pair of pulley structures, shafts upon which said pulley structures are respectively mounted, one of said structures having a pair of pulley sections with opposing inclined belt engaging faces, one of said sections being fixed to its corresponding shaft and the other being axially adjustable thereon, the other pulley structure having a fixed diameter, means for moving the shaft carrying the fixed diameter pulley structure in a direction to vary the center distance, and means for moving the pulley structure having a fixed diameter axially with respect to its shaft, and in accordance with the variation of the center distance.

10. In a variable ratio transmission mechanism, a pair of pulley structures, shafts upon which said pulley structures are respectively mounted, one of said structures having a pair of pulley sections with opposing inclined belt engaging faces, one of said sections being fixed to its corresponding shaft and the other being axially adjustable thereon, the other pulley structure having a fixed diameter, means for moving the shaft carrying the fixed diameter pulley structure in a direction to vary the center distance, means for moving the pulley structure having a fixed diameter axially with respect to its shaft, and in accordance with the variation of the center distance, and means for urging the adjustable pulley section toward the fixed pulley section.

11. In a variable ratio transmission mechanism, a pair of pulley structures, shafts upon which said pulley structures are respectively mounted, one of said structures having a pair of pulley sections with opposing inclined belt engaging faces, one of said sections being fixed to its corresponding shaft and the other being axially adjustable thereon, the other pulley structure having a fixed diameter, means for moving the shaft carrying the fixed diameter pulley structure in a direction to vary the center distance, means for moving the pulley structure having a fixed diameter axially with respect to its shaft, and in accordance with the variation of the center distance, and resilient means for urging the adjustable pulley section toward the fixed pulley section.

12. In a variable ratio transmission mechanism, a pair of pulley structures, shafts upon which said pulley structures are respectively mounted, one of said structures having a pair of pulley sections with opposing inclined belt engaging faces, one of said sections being fixed to its corresponding shaft and the other being axially adjustable thereon, the shaft carrying the other pulley structure being movable in a direction to vary the center distance, means for moving said latter shaft in a direction normal to the axes of the shafts, and means for adjusting at least a part of the pulley structure carried by the movable shaft, in an axial direction with respect to its shaft, in response to center distance adjustment and in accordance with the variation in center distance.

13. In a variable ratio transmission mechanism, a pair of pulley structures, shafts upon which said pulley structures are respectively mounted, one of said structures having a pair of pulley sections with opposing inclined belt engaging faces, one of said sections being fixed to its corresponding shaft and the other being axially adjustable thereon, the shaft carrying the other pulley structure being movable in a direction to vary the center distance, means for moving said latter shaft in a direction normal to the axes of the shafts, means for adjusting at least a part of the pulley structure carried by the movable shaft, in an axial direction with respect to its shaft, in response to center distance adjustment and in accordance with the variation in center distance, and means for urging the adjustable pulley section toward the fixed pulley section.

14. In a variable ratio transmission, between a motor and a load driving shaft, a plurality of pairs of cooperating pulley structures mounted respectively on the load driving shaft and on the motor shaft, belts for connecting the cooperating pulleys of each of said pairs, at least one of said pairs of pulley structures together with its belt being disposed on the opposite side of the motor from that on which the other structures are disposed, one corresponding structure of each pair having a pair of relatively axially adjustable pulley sections with opposed inclined belt engaging faces, forming by relative adjustment, variable effective pulley diameters, and means for simultaneously adjusting said adjustable pulley sections, whereby the effective diameters of the corresponding pulleys are maintained substantially equal at all times.

15. In a variable ratio transmission, between a motor and a load driving shaft, a plurality of pairs of cooperating pulley structures mounted respectively on the load driving shaft and on the motor shaft, belts for connecting the cooperating pulleys of each of said pairs, at least one of said pairs of pulley structures together with its belt being disposed on the opposite side of the motor from that on which the other structures are disposed, a corresponding structure of each pair having a pair of axially adjustable pulley sections with opposed inclined belt engaging faces, forming, by relative adjustment variable effective pulley diameters, means for varying the center distance between the motor and the load driving shaft, and means for increasing the effective diameter of the variable diameter pulley structures as the center distance is increased.

16. In a variable ratio transmission mechanism between a load driving shaft and a motor, a base for supporting the motor, a pair of pulley structures mounted respectively on the load driving shaft and the motor shaft, said structures having a pair of pulley sections with opposed inclined belt engaging faces, one of said sections being fixed to its corresponding shaft and the other being axially adjustable thereon, means to cause at least a part of the pulley structure carried by the motor shaft to be moved thereon in an axial direction, said means including a lever pivotally supported on the motor frame and operatively connected to said part of the pulley structure, a threaded rod rotatively carried by the motor base and arranged to swing the lever about its pivot upon being rotated, a hand wheel for rotating the rod, and gearing operatively connecting the hand wheel and the rod.

17. In a variable ratio transmission between a motor and a load driving shaft, a pair of pulley structures mounted respectively on the load driving shaft and on the motor shaft, a belt connecting the pulley structures, one of said structures having a pair of relatively axially movable pulley sections with opposing inclined belt engaging faces forming by relative axial adjustment variable effective pulley diameters, means for varying the center distance between the structures, means for increasing the effective diameter of said pulley structure as the center distance is increased, bearings supporting the load driving shaft, and means forming a common support for the motor and said bearings.

18. In a variable ratio transmission between a motor and a load driving shaft, a plurality of pairs of cooperating pulley structures mounted respectively on the motor shaft and the load driving shaft, belts connecting the cooperating pulley structures of each pair, the structures on one of said shafts each having a fixed section and an axially movable section, said sections having opposed inclined belt engaging faces forming by relative axial adjustment variable effective pulley diameters, the corresponding sections of said last mentioned structures being respectively axially fixed and axially movable, means connecting the movable sections for simultaneous adjustment, and resilient means confined between the fixed section of one structure and the movable section of the next adjacent structure for urging said sections apart.

19. In a variable ratio transmission between a motor and a load driving shaft, a plurality of pairs of cooperating pulley structures mounted respectively on the motor shaft and the load driving shaft, belts connecting the cooperating pulley structures of each pair, the structures on one of said shafts each having a pair of relatively axially movable pulley sections with opposed inclined faces forming by relative axial adjustment variable effective pulley diameters, means connecting corresponding sections of said last mentioned structures for simultaneous adjustment, and resilient means confined between the adjacent sections of adjoining structures for urging said sections apart.

20. In a variable ratio transmission between a motor and a load driving shaft, a plurality of pairs of cooperating pulley structures mounted respectively on the motor shaft and on the load driving shaft, belts connecting the cooperating pulley sections of each pair, the structures on one of said shafts each having a fixed section and an axially movable section, said sections having opposed inclined faces forming by relative axial adjustment variable effective pulley diameters, the corresponding sections of said last mentioned structures being respectively axially fixed and axially movable, the movable sections having a long common hub slidable on the shaft and supporting as well as slidable through the intervening fixed section, said hub having a deep counterbore terminating in a shoulder, a collar on the shaft, and a compression spring encircling the shaft partly within said counterbore, and confined between the shoulder and the collar for urging the pulley sections of each structure together.

21. In a variable ratio transmission between a motor and a load driving shaft, a plurality of pairs of cooperating pulley structures mounted respectively on the motor shaft and on the load driving shaft, belts connecting the cooperating pulley sections of each pair, the structures on one of said shafts each having a fixed section and an axially movable section, said sections having opposed inclined faces forming by relative axial adjustment variable effective pulley diameters, the corresponding sections of said last mentioned structures being respectively axially fixed and axially movable, the movable sections having a long common hub slidable on the shaft and supporting as well as slidable through the intervening fixed section, said hub having a deep counterbore terminating in a shoulder, a collar on the shaft, a compression spring encircling the shaft partly within said counterbore, and confined between the shoulder and the collar for urging the pulley sections of each structure together, and resilient means confined between the fixed section of one structure and the movable sction of the next adjacent structure for supplementing the force of said compression spring.

THOMAS G. MYERS.